Figure 3:
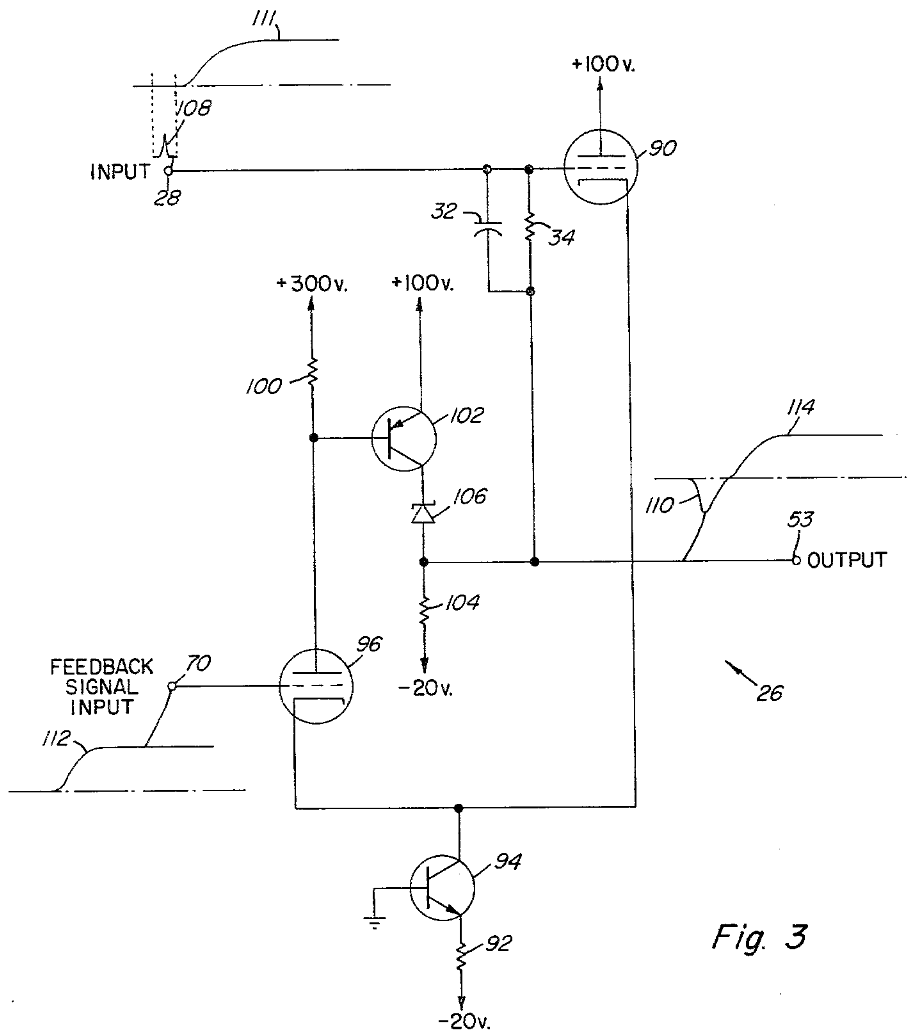

Jan. 11, 1966 J. V. ROGERS 3,229,212
DIRECT SAMPLING APPARATUS
Filed Feb. 18, 1963 2 Sheets-Sheet 1
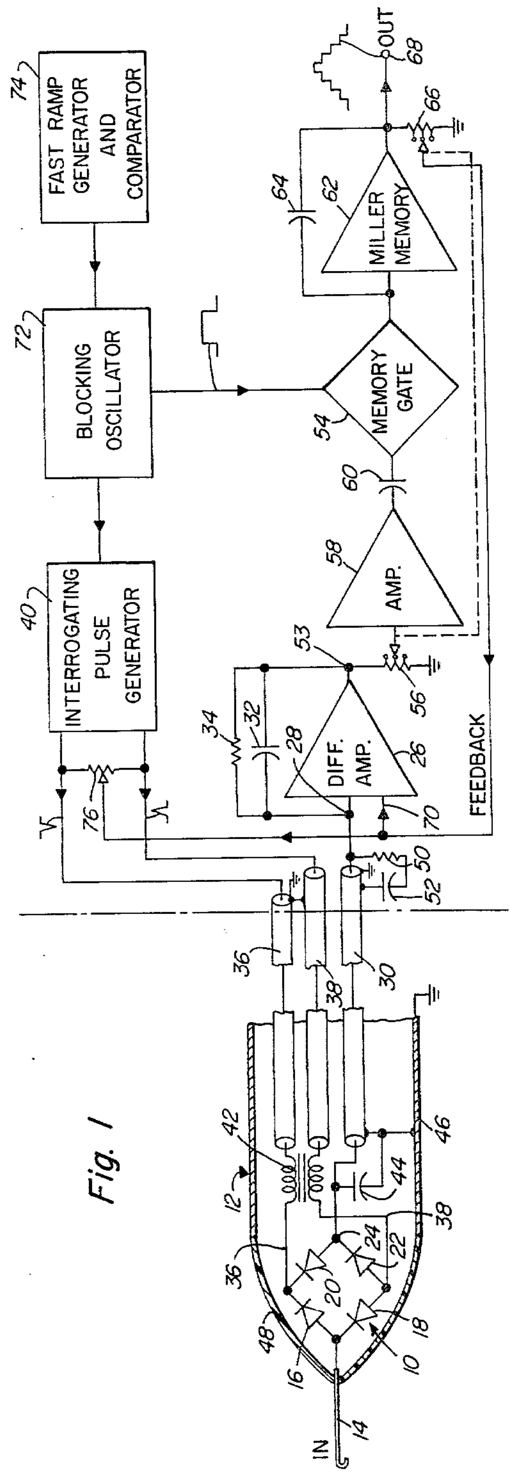
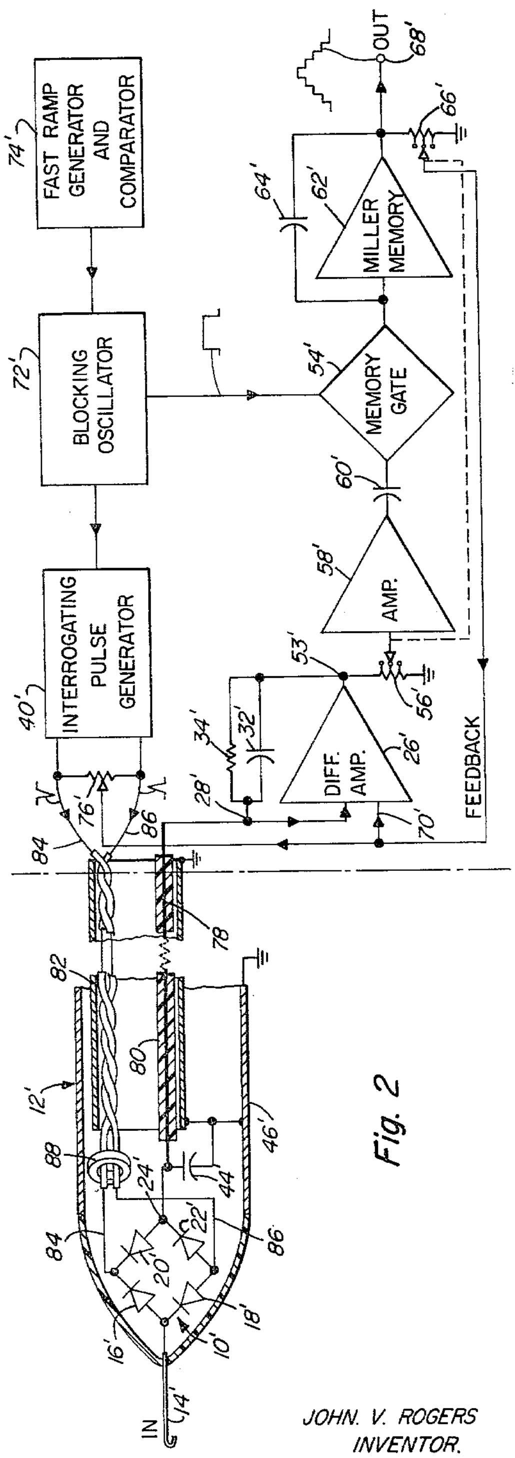
JOHN. V. ROGERS
INVENTOR.
BY
BUCKHORN, BLORE, KLARQUIST & SPARKMAN
ATTORNEYS

DIRECT SAMPLING APPARATUS

JOHN V. ROGERS
INVENTOR.

BY

BUCKHORN, BLORE, KLARQUIST & SPARKMAN
ATTORNEYS

United States Patent Office 3,229,212
Patented Jan. 11, 1966

1

3,229,212
DIRECT SAMPLING APPARATUS
John V. Rogers, Portland, Oreg., assignor to Tektronix, Inc., Beaverton, Oreg., a corporation of Oregon
Filed Feb. 18, 1963, Ser. No. 259,064
12 Claims. (Cl. 328—15)

The subject matter of the present invention relates generally to electrical apparatus for reproducing a high frequency input signal as a low frequency output signal by obtaining samples of different portions of such input signal and combining such samples together to form the output signal, and in particular is directed to a sampling circuit in which a sampling gate is employed within a test probe for connecting the input of such sampling gate directly to the circuit under test and in which the output of such gate is connected through a transmission line to a differential amplifier located outside of each probe remote from the sampling gate.

The signal sampling apparatus of the present invention is especially useful when employed as the input circuit to the vertical amplifier of a sampling type of cathode ray oscilloscope. The present direct sampling circuit enables the input of the sampling gate to be connected directly to the circuit under test so that the input signal to such sampling gate is not appreciably attenuated or distorted by the usual interconnecting coaxial cables between the test probe and such gate and the source of such input signal is not loaded by the additional impedance of such cables. Previous signal sampling apparatus employ a vacuum tube positioned within the probe and connected as a cathode follower amplifier with its input connected to the output of the sampling gate, in order to amplify the sample pulse transmitted through such sampling gate before transmitting such sample pulse to the oscilloscope. This preamplification was considered necessary because of the fact that the sampling efficiency of the sampling gate is less than 100% and may be as low as 1%, so that without preamplification, the additional attenuation of the cables between such gate and the oscilloscope is sometimes enough to decrease the magnitude of the sample pulse sufficiently to render it undetectable.

The sampling circuit of the present invention has an advantage over previous direct sampling circuits in that it does not require preamplification of the sample pulse before transmitting such pulse from the sampling gate in the test probe to a differential amplifier in the oscilloscope. A portion of this differential amplifier is connected as an operational amplifier with a negative feedback impedance connected from the output of such differential amplifier to the input of the operational amplifier portion, such feedback impedance including a capacitor in parallel with a resistor. The input of the operational amplifier portion of the differential amplifier is connected directly to the output of the sampling gate through a transmission line. Thus, the present sampling apparatus does not employ a cathode follower tube within the probe so that the physical size of such probe is thereby substantially reduced. This reduction in size of the sampling probe is extremely important, because it is often quite difficult to reach a test point in computers or other electrical apparatus employing a large number of circuit elements for the production of high frequency signals which must be examined by sampling techniques.

It is therefore one object of the present invention to provide an improved sampling apparatus for reproducing a high frequency input signal as a low frequency output signal.

A further object of the invention is to provide an improved sampling apparatus in which a sampling gate is mounted inside a test probe and in which a sampling circuit is employed that does not amplify the sample signal transmitted through such gate until such sample signal is transmitted to a remote position outside of such probe, thereby enabling the probe to be of a small physical size.

Another object of the present invention is to provide an improved sampling apparatus in which a sampling gate is employed inside a test probe for direct sampling of an input signal without first transmitting such input signal through connecting cables, and in which a differential amplifier having a portion connected as an operational amplifier is employed at a remote position outside of said such probe to amplify the sample pulse transmitted from such sampling gate through a transmission line to such amplifier without materially distorting such sample pulse.

An additional object of the present invention is to provide a sampling circuit for a sampling oscilloscope in which a sampling gate is employed inside a test probe along with a storage capacitor connected to the output of such gate and in which a differential amplifier is employed at a remote position outside such probe with one portion of such differential amplifier connected as an operational amplifier having a negative feedback impedance including a capacitor in parallel with a resistor, to reproduce a high frequency input signal applied to the inner conductor of such probe as a low frequency output signal of a similar waveform.

Still another object of the present invention is to provide an improved electrical circuit in which a differential amplifier is employed with a portion of such differential amplifier connected as an operational amplifier having a negative feedback impedance including a capacitor in parallel with a resistor to amplify an input signal applied to the input of such operational amplifier and to produce an output signal at the output of the differential amplifier without changing the voltage on this one input of the differential amplifier, and to produce a difference signal at the output of such differential amplifier when a reference voltage related to the output signal is applied to the other input of the differential amplifier which is transmitted through the feedback resistor to change the voltage on such one input until it equals such reference voltage.

A still further object of the invention is to provide an improved sampling probe apparatus of reduced size which transmits sample signals with less attenuation and waveform distortion.

Additional objects and advantages of the present invention will be apparent from the following, detailed descriptions of preferred embodiments thereof and from the attached drawings of which:

FIG. 1 is a schematic diagram of one embodiment of the sampling apparatus of the present invention, FIG. 2 is a schematic diagram of another embodiment of the sampling apparatus of the present invention, and FIG. 3 is a schematic diagram of one embodiment of the differential amplifier employed in the apparatus of FIGS. 1 and 2.

One embodiment of the direct sampling apparatus of the present invention is shown in FIG. 1 to include a sampling gate 10 located within a test probe 12 with the input terminal of such sampling gate connected directly to the inner conductor 14 extending through the tip of such test probe. The sampling gate 10 may be in the form of a four diode bridge including a pair of input diodes 16 and 18 and a pair of output diodes 20 and 22. The anode and cathode of input diodes 16 and 18, respectively are connected to the inner conductor 14, while the anode and cathode of output diodes 20 and 22 respectively, are connected to the output terminal 24 of such sampling gate. As has been discussed previously, by locating the sampling gate 10 within the test probe rather than within the oscilloscope connected to such probe, it is possible to avoid distortion of the input signal by interconnecting cables before transmitting a portion of such signal through such sampling gate. In addition this also prevents any appreciable loading of the signal source by the impedance of cables because the sampling gate is normally biased to a nonconducting state.

The sampling efficiency of the sampling gate 10 is considerably less than 100% because the capacitance load connected to the output of such gate is charged through the resistance of the signal source and the gate so that the output signal of such gate may have a voltage as low as 1% of the input signal when the gate is "opened" by an interrogating pulse. This attenuation of the input signal by the sampling gate presents a problem when the sampling gate is located in the test probe because, without further amplification, the output sample signal would ordinarily be attenuated to a magnitude below the minimum voltage which can be detected by the oscilloscope. The sampling apparatus of the present invention employs a differential amplifier 26 to eliminate the necessity of positioning an amplification circuit within the probe housing as previous direct sampling apparatus have done to compensate for this attenuation.

The differential amplifier 26 is connected by one of its input terminals 28 through a coaxial cable 30, or other suitable transmission line, to the output terminal 24 of the sampling gate 10. A portion of the differential amplifier 26 is connected as an operational amplifier with its input connected to input terminal 28 and having a negative voltage feedback impedance connected from the output of the differential amplifier to such input. The feedback impedance of the operational amplifier includes a feedback capacitor 32 connected in parallel with the feedback resistor 34. The sample signal applied to the input of the operational amplifier is reversed in phase and amplified before being applied as a negative voltage feedback signal through feedback capacitor 32 to the input terminal 28. The internal gain of the operational amplifier is quite high in the order of 1,000 to 2,000 so that this negative feedback signal prevents the voltage on the input terminal 28 from changing any substantial amount while causing the voltage at the output of the differential amplifier to change in accordance with such input signal. It should be noted that the overall gain of an operational amplifier is less than the internal gain of such amplifier and that such overall gain is substantially the same as the ratio of the feedback impedance to the input impedance seen by such operational amplifier.

The diodes of the sampling gate 10 are normally biased nonconducting in a manner hereinafter described. The side terminals of the sampling bridge 10 at the common cathode connection of diodes 16 and 20 and the common anode connection of diodes 18 and 22 are connected by means of lead wires 36 and 38 respectively, to an interrogating pulse generator 40. This pulse generator produces interrogating or sampling pulses having sufficient voltage amplitude to forward bias the diodes of the sampling gate conducting in order to "open" such gate for an extremely short length of time determined by the width of such interrogating pulses. It should be noted that a negative interrogating pulse is transmitted through lead wire 36 to the cathodes of diodes 16 and 20 while a positive interrogating pulse is transmitted through lead wire 38 to the anode of diodes 18 and 22 in order to forward bias such diodes. If an input signal is applied to inner conductor 14 at the time the interrogating pulses are applied to the sampling gate 10, a portion of the input signal is transmitted through the sampling gate to the output terminal 24 of such gate as a sample signal of less voltage due to the sampling efficiency previously discussed.

The lead wires 36 and 38 are transformer coupled by a transformer 42 connected to such lead wires at a position adjacent the sampling gate 10 in order to prevent the input signal from being transmitted through these lead wires rather than to the output terminal 24 of the gate. As shown in FIG. 1 the lead wire 36 may form the primary winding while the lead wire 38 forms the secondary winding of transformer 42 so that such transformer is a high impedance for signals of the same polarity flowing through the transformer windings, as would be in the case of the input signal, but is a low impedance for signals of opposite polarity as is true of the interrogating pulses. These lead wires 36 and 38 may be in the form of small coaxial cables in those portions of the wires which extend between the transformer 42 and the pulse generator 40 in order to transmit the interrogating pulses with a minimum of distortion.

After the sample signal is transmitted to the output terminal 24 of the sampling gate 10, it is stored momentarily in a storage capacitor 44 connected from such output terminal to ground, such as at the outer shield conductor 46 of the probe 12. This shield conductor is insulated from the inner conductor 14 of such probe in a conventional manner by means of a nose member 48 of plastic or other suitable insulating material. It should be noted that the reference voltage previously stored on this storage capacitor 44 determines whether a sample signal is transmitted through the sampling gate when an interrogating pulse is applied to such gate, as well as the magnitude of such sampling signal, since the input signal applied to the input terminal of the gate must be of a different amplitude than the reference voltage on such storage capacitor before a sampling signal is produced. A portion of the sample signal temporarily stored in storage capacitor 44, is transmitted down the coaxial cable 30 to the input terminal 28 of the differential amplifier 26 after the sampling gate is rendered nonconducting or "closed." The coaxial cable 30 is terminated at its output end by a termination resistor 50 connected from the inner conductor of such cable through a blocking capacitor 52 to ground. The resistance of the termination resistor 50 may be made equal to the characteristic impedance of the coaxial cable 30 in order to prevent reflections of the sample signal from such termination, while the capacitance of the blocking capacitor 52 is of a value which allows transmission of part of such sample signal to ground but blocks any D.C. current flow. The main portion of the sample signal transmitted through the coaxial cable 30 to the input terminal 28 of the differential amplifier 26, is transmitted by means of the operational amplifier portion of such differential amplifier to the feedback capacitor 32. This feedback capacitor 32 appears to have a much greater capacitance than it actually has due to the high internal gain of the operational amplifier. Thus, while the feedback capacitor may actually be one picofarad, it appears to the sample signal as though it has a capacitance of, for example, 2,000 picofarads, when the internal gain of the operational amplifier is 2,000. If the storage capacitor 44 and the blocking capacitor 52 are each 50 picofarads and the distributed capacity of the coaxial cable 30 is 100 picofarads, most of the sample signal current is used to change the charge on the feedback capacitor 52 because it is effectively connected in parallel with the storage capacitor, the blocking capacitor, and the cable capacitance.

The operational amplifier portion of the differential amplifier 26 operates in a conventional manner to amplify the sample signal applied to input terminal 28 and to invert such signal in order to charge the feedback capacitor 32 in such a manner that the voltage at the input terminal 28 remains substantially constant, while the voltage of the output terminal 53 of the differential amplifier varies with the amplified sampling signal in order to produce a voltage drop across the feedback resistor 34. It should be noted that the feedback resistor 34 has a sufficiently large resistance not to affect the proper operation of the operational amplifier, and to prevent the discharge of the feedback capacitor through such resistor before the amplified sample signal on output terminal 53 is transmitted through a memory gate 54 in a manner hereafter described. It should be noted that the differential amplifier 26 operates at this time in the manner of an operational amplifier rather than as a differential amplifier, because an output signal voltage is produced at the output terminal 53 even though the input voltage at input terminal 28 does not change appreciably and there is almost no difference in the voltages applied to both of the input terminals of the differential amplifier.

The remainder of the sampling circuit of FIG. 1 is similar to the circuit shown in FIG. 3 of the copending United States patent application Ser. No. 192,806, entitled Ratchet Memory Circuit which was filed on May 7, 1962, by John R. Kobbe et al., and for this reason the remainder of the sampling circuit will not be described in detail. However, the output terminal of the differential amplifier 26 is connected through a potentiometer 56, an amplifier 58 and a coupling capacitor 60 to the memory gate 54 which is normally biased nonconducting or "closed." When the memory gate is forward biased "open" in a manner hereafter described, the sample signal is transmitted through the memory gate to a Miller memory circuit 62 having a negative feedback capacitor 64 connected from its output to its input. The Miller memory circuit 62 has a high internal gain and inverts the sampling signal before storing it in the memory capacitor 64 so that the memory circuit operates as an operational amplifier to change its output voltage while its input voltage remains substantially constant. After the sample signal is transmitted through the memory gate to the Miller memory circuit, such memory gate "closes" so that the charge remains on the feedback capacitor 64 because the output impedance of the operational amplifier is quite high. The sample signal is added to the voltage sum of previous sample signals stored in memory capacitor 64 in order to produce an output voltage signal across an output potentiometer 66 at an output terminal 68.

A portion of the output voltage produced at output terminal 68 is transmitted as a feedback signal reference voltage from the movable contact of potentiometer 66 through a feedback conductor to the other input 70 of the differential amplifier 26. The magnitude of the reference voltage transmitted to the other input 70 of the differential amplifier is controlled by the settings of voltage divider potentiometers 56 and 66 whose movable contacts are ganged together in order to maintain the overall gain of the sampling circuit, from the input of the sampling gate to the output of the memory circuit and back to the output of the sampling gate through the feedback circuit, equal to one. This unity gain makes the reference voltage equal to the voltage of the portion of the previous input signal corresponding to the sample signal producing such reference voltage. The gain of the circuits 26, 58, 54, and 62 multiplied by the attenuation of voltage dividers 56 and 66 is made equal to the reciprocal of the sampling efficiency of the sampling gate 10 in order to provide an overall gain of one. Thus, the potentiometer 56 is varied to change the output voltage at output terminal 68, while the potentiometer 66 is varied in the opposite direction to compensate for the effect of the potentiometer 56 on the gain of the feedback reference voltage. It will be subsequently shown that this feedback voltage is applied to the voltage capacitor 44.

When the reference voltage on input 70 of the differential amplifier 26 changes due to a sample signal being stored in the Miller memory circuit 62, the voltages on the two inputs 28 and 70 of the differential amplifier become unequal. The result as explained below, is that a difference signal is produced at the output 53 of such differential amplifier. This difference signal is of the same voltage and polarity as the change in the reference voltage, and is transmitted through the feedback impedance including feedback resistor 34 and capacitor 32 to the input terminal 28 of the differential amplifier. The difference signal is transmitted to storage capacitor 44 to apply a correction voltage to such storage capacitor in order to change the voltage on such capacitor until it equals the reference voltage corresponding to the input signal voltage of the previous sample. At the same time, the blocking capacitor 52 and the cable capacitance are also charged in parallel with the capacitor 44 until the voltage at input terminal 28 also equals the reference voltage applied to the other input 70 of the differential amplifier. When this occurs, of course, the charging or discharging of storage capacitor 44 ceases. It should be noted that the voltage at the output 53 of the differential amplifier that charges to the value of the reference voltage and that such output signal produced by the differential amplifier is not transmitted to the Miller memory circuit 62 to affect the output voltage at 68 because the memory gate 54 is "closed" or rendered nonconductive at this time.

The memory gate 54 is normally reverse biased nonconducting to prevent the output signal stored on memory capacitor 64 from discharging through such memory gate. A blocking oscillator 72 is connected to the memory gate so that the gating pulse produced by the oscillator renders such gate conducting. The input of the blocking oscillator 72 is connected to a fast ramp generator and comparator circuit 74 which produces output pulses that cause such oscillator to produce gating pulses. The output pulses are varied or "slewed" in time with respect to the input signal applied to the inner conductor 14 by the operation of the compartor circuit 74 so that each of the output pulses corresponds in time to a different portion of the input signal waveform to enable sampling of such waveform. It should be noted that the sampling apparatus of the present invention differs from that in copending application 192,806 in that the comparator circuit 74 is triggered by an external trigger signal, and not by the input signal applied to the probe. The blocking oscillator 72 is also connected to the interrogating pulse generator 40 so that a gating pulse from such oscillator triggers such pulse generator. Thus, an output pulse from the fast ramp generator and comparator circuit 74 also causes interrogating pulses to be produced in pulse generator 40 and transmitted to the sampling gate 10 in order to forward bias such sampling gate conducting. This "opening" of the sampling gate allows a sample signal to be transmitted through such sampling gate.

The sampling gate 10 is rendered nonconducting by a floating D.C. bias voltage derived from the interrogating pulse generator. Typically, line 36 is maintained at +2 volts in respect to the movable contact center arm of potentiometer 76 and line 38 is maintained −2 volts in respect to the center arm of potentiometer 76. However, these D.C. bias voltages may range from +½ volt to 2½ volts on line 36 and from −½ volt to −2½ volts on line 38 as determined by internal adjustments in the interrogating pulse generator. This means that the D.C. bias voltage floats in respect to ground as a function of the reference voltage applied to the input 70 of the differential amplifier 26. Since the reference voltage applied to the input 70 of the differential amplifier 26 is equal to the reference voltage on the storage capacitor 44, the D.C. bias voltage on lines 36 and 38 floats in respect to ground as a function of the reference voltage on storage capacitor 44. The interrogating pulses riding the bias voltage on lines 36 and 38 are opposite in polarity and large enough to more than overcome the reverse D.C. bias on the sampling gate diodes. The sampling gate is turned on "hard" or highly forward biased by the interrogating pulses so that large voltage input signals do not have enough magnitude to reverse bias the diodes and close the gate.

The sampling apparatus of FIG. 2 is similar to that of FIG. 1 so that the same reference numerals have been employed to indicate identical components and only the differences between the two apparatus will be described in detail. As shown in FIG. 2, the termination resistor 50 and the blocking capacitor 52 have been eliminated and the coaxial cable 30 is replaced by a resistance wire conductor 78. The resistance wire conductor 78 is surrounded by a sleeve of insulating material 80 which is covered by a shield conductor 82 in order to form a coaxial cable type transmission line. The resistance wire 78 is the signal carrying conductor of the transmission line and effectively distributes a large amount of resistance along the length of such transmission line in order to prevent spurious oscillation or "ringing" due to reflections of the sample signal from the unterminated ends of the transmission line. Thus, the resistance wire 78 performs the function of the termination resistor 50 of FIG. 1.

In addition, the coaxial cables 36 and 38 together with the transformer 42 in FIG. 1 may be replaced by a twisted pair of insulated lead wires 84 and 86 and a ferrite bead transformer core 88, respectively. The lead wires 84 and 86 are twisted together in opposite directions and mounted within the shield conductor 82 along with the resistance wire 78 in order to form a pair of transmission lines of extremely small size. The output ends of the twisted lead wires 84 and 86 are connected to the sampling gate 10' in a similar manner to the leads 36 and 38, respectively, of FIG. 1. However, in order to provide transformer isolation, the twisted lead wires are simply passed through the small annular ferrite core 88. This enables the test probe 12' of FIG. 2 to be of even smaller size than the test probe 12 of FIG. 1.

One embodiment of the differential amplifier 26 and 26' of FIGS. 1 and 2 is shown in FIG. 3. The input terminal 28 of the differential amplifier 26 is connected to the grid of a triode vacuum tube 90. The anode of tube 90 is connected to a source of positive D.C. bias voltage and the cathode of such tube is connected to a source of negative D.C. bias voltage through a load resistor 92 and a current regulating transistor 94, so that such tube functions as a cathode follower amplifier. The base of the NPN type transistor 94 is connected to ground and its collector is connected to cathode of tube 90, while the emitter of such transistor is connected to the load resistor 92. A substantially constant voltage is maintained across the load resistor 92 due to the fact that the emitter of transistor 94 is always at about −.5 volt to forward bias the emitter junction of such transistor. This provides a substantially constant current flow through load resistor 92 and from the emitter to the collector of the transistor 94. Approximately one-half of this current is supplied to the tube 90 while the other half is supplied to the cathode of another triode vacuum tube 96. The grid of tube 96 is connected at input terminal 70 to the movable contact on voltage divider 66 of FIG. 1 so that the feedback reference voltage is applied to such grid. The cathode of the second tube 96 is connected to the cathode of the first tube 90, while the plate of such second tube is connected to a source of positive D.C. bias voltage through a load resistor 100.

A PNP-type inverter transistor 102 is connected by its base across the load resistor 100. The emitter of transistor 102 is connected to a source of positive D.C. bias voltage, while the collector of such transistor is connected to a source of negative D.C. bias voltage through a load resistor 104 and a Zener diode 106. The output signal of the differential amplifier is obtained across load resistor 104 and transmitted to the output terminal 53 which can have a quiescent voltage at ground potential while the Zener diode 106 enables the collector of transistor 102 to have a quiescent voltage at approximately +75 volts due to the voltage across such diode so that the transistor 102 is normally conducting. The feedback capacitor 32 and feedback resistor 34 are connected in parallel from the grid of the first tube 90 to the output terminal 53 in order to provide negative feedback for such first tube so that a portion of the differential amplifier is connected as an operational amplifier.

During the operation of the circuit of FIG. 3, a positive input current pulse or sample signal 108 applied to input terminal 28 is transmitted as a positive signal to the cathodes of tubes 90 and 96 and to the base of transistor 102 which inverts the phase of such input signal so that it appears across resistor 104 as a negative output voltage sample pulse 110 on output terminal 53. This negative signal is then fed back through the feedback capacitor 32 as a degenerative feedback signal to maintain the voltage 111 at input terminal 28 substantially constant due to operational amplifier action. However, when a stairstep reference voltage 112 of a positive value is applied to input terminal 70 which is greater than the voltage on input terminal 28, a negative difference signal corresponding to this reference voltage is transmitted to the base of transistor 102 after being inverted by tube 96. The difference signal is again inverted by such transistor so it appears as a positive stairstep output voltage 114 on output terminal 53. This stairstep output voltage is transmitted through the feedback impedance 32 and 34 to increase the input voltage 111 until it equals the reference voltage 112.

In the circuit shown in FIG. 3, the feedback capacitor 32 has a value of about 2 picofarads while the feedback resistor 34 has a value of about 2 megohms so that this parallel circuit has a time constant of about 4 microseconds. Thus, the positive sample current pulse 108 applied to input terminal 28 will appear as the amplified negative sample voltage pulse 110 on output terminal 53 for only a short time due to the fact that the feedback capacitor 32 discharges in 4 microseconds through the feedback resistor 34 to reduce the voltage on such output terminal to its normal quiescent value. However, before this happens, a portion of the amplified sample signal 110 is transmitted through the amplifier 58 and the memory gate 54 of the sampling circuit of FIG. 1 to the Miller memory circuit 62 due to a rapid "opening" and "closing" of such memory gate at approximately the peak value of such sample signal. This portion of the sample signal is added to the sum of previous sample signals stored in capacitor 64 of the Miller memory circuit 62 to produce the reference voltage 112. The stairstep reference voltage 112 applied to input terminal 70, corresponding to this sample signal, is a positive voltage since it is in phase with the original sample signal due to another phase reversal of signal in the Miller memory circuit. The positive stairstep difference voltage 114 produced by this reference voltage increases the input voltage 111 in phase with the previous sample pulse 108 by an amount equal to the feedback signal 112 so that the storage capacitor 44 is charged to the voltage of the portion of the input signal applied to lead 14 corresponding to the previous sample pulse. It should be noted that the output voltage 114 does not return to zero when the input voltage 111 equals the reference votlage 112, as it ordinarily would if the differential amplifier 26 were a conventional differential amplifier, due to the fact that a portion of it is connected as an operational amplifier. Also, the memory gate 54 is "closed" during the production of the difference signal 114 so that it is not transmitted through the D.C. blocking capacitor 60 to the Miller memory circuit 62 and does not affect the sample signal voltage stored in memory capacitor 64.

It will be obvious tho those having ordinary skill in the art that various changes may be made in the details of the preferred embodiment of the present invention without departing from the spirit of that invention. Therefore, the scope of the invention should be determined by the following claims.

I claim:

1. A differential amplifier circuit, comprising:

an operational amplifier having a negative voltage feedback impedance connected from the output to the input of said operational amplifier, said feedback impedance including a resistor in parallel with a capacitor;

a second amplifier connected to said operational amplifier to form a differential amplifier;

means for applying an input signal to the input of said operational amplifier to produce an output signal voltage at the output of said differential amplifier across said capacitor without substantially changing the input voltage of said operational amplifier; and means for applying a portion of said output signal as a feedback voltage to the input of said second amplifier to produce a difference signal at the output of said differential amplifier, which is transmitted through said resistor to change the voltage on the input of said operational amplifier until it equals said feedback voltage.

2. A signal sampling circuit, comprising:

sampling gate means for transmitting a portion of an input signal applied to the input terminal of said sampling gate means, through said sampling gate means to the output terminal thereof as a sample pulse, when an interrogating pulse is applied to said sampling gate means;

a transmission line connected at its input to the output terminal of said sampling gate means;

differential amplifier means including an operational amplifier having a negative feedback impedance formed by the parallel combination of a resistor and a capacitor connected from the output to the input of said operational amplifier, with the one input of said differential amplifier corresponding to the input of said operational amplifier connected to the output of said transmission line so that said sample pulse is transmitted through said transmission line to said operational amplifier to produce an amplified sample signal voltage on the output of said differential amplifier without substantially changing the input voltage of said operational amplifier;

memory means connected at its input to the output of said differential amplifier for adding the amplified sample signal to the previous output voltage of said memory means to produce an output signal which is a reproduction of said input signal at a lower frequency; and feedback means for transmitting a portion of said output signal to the other input terminal of said differential amplifier to produce a difference signal which is transmitted from the output of said differential amplifier through said one input terminal of said differential amplifier to change the reference voltage on the output of said sampling gate means in accordance with the sample pulse voltage.

3. A signal sampling circuit, comprising:

sampling gate means for transmitting a portion of an input signal applied to the input terminal of said sampling gate means, through said sampling gate means to the output terminal thereof as a sample pulse, when an interrogating pulse is applied to said sampling gate means;

pulse generator means for applying interrogating pulses to said sampling gate means to open said gate means;

a transmission line connected at its input to the output terminal of said sampling gate means;

a storage capacitor connected between said transmission line and said sampling gate for storing said sample pulse temporarily;

differential amplifier means including an operational amplifier having a negative feedback impedance formed by the parallel combination of a resistor and a capacitor connected from the output to the input of said operational amplifier, with the input of said operational amplifier connected to the output of said transmission line so that said sample pulse is transmitted from said storage capacitor through said transmission line to said operational amplifier and compared with the voltage on the other input terminal to produce an amplified sample signal on the output of said differential amplifier without substantially changing the input voltage of said operational amplifier;

ratchet memory means connected at its input to the output of said differential amplifier for adding said sample signal to the sum of previous sample signal voltages to produce an output signal which is a reproduction of said input signal at a lower frequency; and feedback means for transmitting a portion of said output signal as a feedback signal to said other input terminal of said differential amplifier to produce a difference signal which is transmitted from the output of said differential amplifier through said resistor to said one input terminal of said differential amplifier and said transmission line to said storage capacitor in order to change the voltage at the output of said sampling gate until it equals that of the previous sampled input signal portion.

4. A sampling circuit for reproducing high frequency input signals as low frequency output signals, comprising:

a hollow test probe having a signal carrying conductor extending from the exterior to the interior of said probe;

sampling gate means mounted inside said probe and connected at its input terminal to said signal carrying conductor for transmitting a portion of an input signal applied to the input terminal of said sampling gate means, through said sampling gate means to the output terminal thereof as a sample pulse, when an interrogating pulse is applied to said sampling gate means;

pulse generator means for applying interrogating pulses to said sampling gate means to open said gate means;

a transmission line connected at its input to the output terminal of said sampling gate means, said transmissioin line having a signal carrying conductor which is made of a high resistance material so that it has an amount of series resistance distributed along its length;

a storage capacitor connected to the common connection between said transmission line and said sampling gate means for storing said sample pulse temporarily;

differential amplifier means including an operational amplifier having a negative feedback impedance formed by the parallel combination of a resistor and a capacitor connected from the output to the input of said operational amplifier, with the input of said operational amplifier connected to the output of said transmission line so that said sample pulse is transmitted from said storage capacitor through said transmission line to said operational amplifier to produce an amplified sample signal on the output of said differential amplifier across said capacitor without substantially changing the input voltage of said operational amplifier;

ratchet memory means connected at its input to the output of said differential amplifier for amplifying and adding said sample signal to the previous output voltage of said memory means to produce an output signal which is a reproduction of said input signal at a lower frequency; and feedback means for transmitting a portion of said output signal as a feedback voltage to said other input terminal of said differential amplifier to produce a difference signal which is transmitted from the output of said differential amplifier through said resistor to said one input terminal of said differential amplifier and along said transmission line to said storage capacitor in order to change the voltage on said input terminal and said storage capacitor until they equal said feedback voltage.

5. A signal sampling apparatus, comprising:
a hollow test probe having an inner conductor extending from the exterior to the interior of said probe and an outer shield conductor insulated from said inner conductor;
sampling gate means mounted inside said probe and connected at its input to said inner conductor, said sampling gate means being normally non-conductive;
pulse generator means for applying interrogating pulses to said sampling gate means to render said gate means conducting for a short time to transmit a portion of an input signal applied to the input terminal of said sampling gate means, through said sampling gate means to the output terminal thereof as a sample pulse;
a transmsission line connected at the input of its inner conductor to the output terminal of said sampling gate means;
a storage capacitor connected from the common connection between said transmission line and said sampling gate to ground for storing said sample pulse temporarily;
a termination impedance connected from the output end of the inner conductor of said transmission line to ground, said termination impedance including a resistor having a resistance equal to the characteristic impedance of said transmission line connected in series with a capacitor;
differential amplifier means including an operational amplifier having a negative feedback impedance formed by the parallel combination of a resistor and a capacitor connected from the output to the input of said operational amplifier, with the input of said operational amplifier connected to the output end of said transmission line so that said sample pulse is transmitted from said storage capacitor through said transmission line to said operational amplifier to produce a sample voltage on the output of said differential amplifier without substantially changing the input voltage of said operational amplifier;
ratchet memory means connected at its input to the output of said differential amplifier for amplifying and adding said sample signal voltage to the previous output voltage of said memory means to produce an output signal which is a reproduction of said input signal at a lower frequency; and
feedback means for transmitting a portion of said output signal as a feedback voltage to said other input terminal of said differential amplifier to produce a difference signal which is transmitted from the output of said differential amplifier through the feedback resistor to said one input terminal of said differential amplifier and along said transmission line to said storage capacitor for changing the charge on said storage capacitor until the voltage on said one input terminal equals the voltage on said other input terminal.

6. An electrical circuit, comprising:
a differential amplifier having a feedback impedance connected from the output terminal to one of the input terminals of said differential amplifier so that a portion of said differential amplifier is connected as an operational amplifier with degenerative feedback, said feedback impedance including a capacitor connected in parallel with a resistor, said differential amplifier including another amplifier portion connected to the operational amplifier portion and to another input terminal of said differential amplifier so that an output signal is transmitted from its output terminal when an input signal is applied to said one input terminal without changing substantially the voltage on said one input terminal; and
means connected to the output terminal of said differential amplifier for amplifying said output signal, for adding it to the sum of previous output signals to produce a resultant signal, and for applying a portion of said resultant signal to the other input of said differential amplifier to produce a difference signal at the output terminal of said differential amplifier which is transmitted through said resistor of said feedback impedance to the input of said operational amplifier in order to change the voltage bias on said one input terminal until it equals that on said other input terminal.

7. An electrical circuit, comprising:
a differential amplifier having a feedback impedance connected from the output terminal to one of the input terminals of said differential amplifier so that a portion of said differential amplifier is connected as an operational amplifier with degenerative feedback, said feedback impedance including a capacitor connected in parallel with a resistor, said differential amplifier including another amplifier portion connected to the operational amplifier portion and to another input terminal of said differential amplifier so that an output signal is transmitted from its output terminal when an input signal is applied to said one input terminal without substantially changing the voltage on said one input terminal;
ratchet memory means connected to the output terminal of said differential amplifier for amplifying said output signal, for adding it to the voltage of previous output signals to produce a resultant signal, and for storing said resultant signal; and
feedback means connected from the output of said memory means to the input of said second amplifier, for applying a portion of said resultant signal to the input of said differential amplifier to produce a difference signal at the output terminal of said differential amplifier, which is transmitted through said resistor of said feedback impedance to the input of said operational amplifier in order to change the voltage on said one input terminal until it equals that on said another input terminal.

8. An electrical circuit, comprising:
a first amplifier having a feedback impedance connected from the output to the input of said first amplifier so that it is an operational amplifier with degenerative feedback, said feedback impedance including a capacitor connected in parallel with a resistor;
a second amplifier connected to said first amplifier so that said first and second amplifiers, together form a differential amplifier which transmits an output signal from its output terminal when the input signal is applied to the input of said first amplifier without substatnially changing the voltage on such input and even though this voltage is equal to the voltage on the input of said second amplifier;
ratchet memory means connected to the output terminal of said differential amplifier for amplifying said output signal, for adding it to the voltage sum of previous output signals to produce a resultant signal, and for storing said resultant signal; and
feedback means connected from the output of said memory means to the input of said second amplifier, for applying a portion of said resultant signal to the input of said second amplifier to produce a difference signal at the output terminal of said differential amplifier, which is transmitted through said resistor of said feedback impedance to the input of said first amplifier in order to change the voltage on the input of said first amplifier until it equals that on the input of said second amplifier.

9. An electrical circuit, comprising:
a first amplifier having a feedback impedance connected from the output to the input of said first amplifier so that it is an operational amplifier with degenerative feedback, said feedback impedance including a capacitor connected in parallel with a resistor;

a second amplifier connected to said first amplifier so that said first and second amplifiers together form a differential amplifier which transmits an output signal from its output terminal when the input signal is applied to the input of said first amplifier without substantially changing the voltage on such input and even though this voltage is equal to the voltage on the input of said second amplifier;

ratchet memory means including a memory gate and a Miller integrator memory circuit, connected to the output terminal of said differential amplifier for amplifying said output signal, for adding it to the voltage sum of previous output signals to produce a resultant signal in the form of a stair-step voltage and for storing said resultant signal; and feedback means connected from the output of said memory means to the input of said second amplifier, for applying a portion of said resultant signal to the input of said second amplifier to produce a difference signal at the output terminal of said differential amplifier, which is transmitted through said resistor of said feedback impedance to the input of said first amplifier in order to change the voltage bias on the input of said first amplifier until it equals that on the input of said second amplifier.

10. A signal sampling device, comprising:

an electrical probe including a signal conductor and a shield conductor insulated from said signal conductor;

sampling gate means mounted inside said probe with the input terminal of said sampling gate means connected to said signal conductor, for transmitting a portion of an input signal applied by said signal conductor to said input terminal through said sampling gate means to the output terminal thereof when an interrogating pulse is applied to said sampling gate; and a transmission line including an inner signal conductor and an outer shield conductor, said inner conductor being connected at its input to the output terminal of said sampling gate means and made of high resistance material to provide an amount of series resistance distributed along its length to prevent signal oscillations in said transmission line due to reflections from the ends of said line.

11. A signal sampling device, comprising:

an electrical probe including a signal conductor extending through one end of said probe and a hollow shield conductor positioned around said signal conductor and insulated from said signal conductor;

sampling gate means mounted inside said probe with the input terminal of said sampling gate means connected to said signal conductor, for transmitting a portion of an input signal applied by said signal conductor to said input terminal through said sampling gate means to the output terminal thereof when an interrogating pulse is applied to said sampling gate means;

means within said probe for applying interrogating pulses to said sampling gate means;

a storage capacitor within said probe connected between the output terminal of said sampling gate means and ground; and a transmission line including an inner signal conductor and an outer shield conductor extending through the other end of said probe, said inner conductor being connected at its input to the output terminal of said sampling gate means and made of high resistance material to provide an amount of series resistance distributed along its length to prevent signal oscillations in said transmission line due to reflections from the ends of said line.

12. A signal sampling device, comprising:

an electrical probe including a signal conductor extending through one end of said probe and a hollow shield conductor positioned around said signal conductor and insulated from said signal conductor;

sampling gate means mounted inside said probe with the input terminal of said sampling gate means connected to said signal conductor, for transmitting a portion of an input signal applied by said signal conductor to said input terminal through said sampling gate means to the output terminal thereof when an interrogating pulse is applied to said sampling gate means;

means for applying interrogating pulses to said sampling gate means, including a pair of conductors extending through the other end of said probe and connected to said gate means, and a magnetic core positioned within said probe about said pair of conductors so that said pair of conductors pass through said core; and a transmission line including an inner signal conductor and an outer shield conductor extending through the other end of said probe, said inner conductor being connected at its input to the output terminal of said sampling gate means and made of high resistance material to provide an amount of series resistance distributed along its length to prevent signal oscillations in said transmission line due to reflections from the ends of said line.

No references cited.

ARTHUR GAUSS, *Primary Examiner.*